(12) United States Patent
Ishibashi (10) Patent No.: US 11,718,134 B1
(45) Date of Patent: Aug. 8, 2023

(54) VEHICLE

(71) Applicant: KAWASAKI MOTORS, LTD., Akashi (JP)

(72) Inventor: Kazuki Ishibashi, Akashi (JP)

(73) Assignee: KAWASAKI MOTORS, LTD., Akashi (JP)

( * ) Notice: Subject to any disclaimer, the term of this patent is extended or adjusted under 35 U.S.C. 154(b) by 0 days.

(21) Appl. No.: 17/660,272

(22) Filed: Apr. 22, 2022

(51) Int. Cl.
| *B60G 11/18* | (2006.01) |
| *B60G 11/20* | (2006.01) |
| *B60G 17/08* | (2006.01) |
| B60G 17/02 | (2006.01) |

(52) U.S. Cl.
CPC ............ *B60G 11/20* (2013.01); *B60G 11/182* (2013.01); *B60G 17/08* (2013.01); *B60G 17/025* (2013.01); *B60G 2200/144* (2013.01); *B60G 2204/422* (2013.01); *B60G 2300/07* (2013.01)

(58) Field of Classification Search
CPC .............. B60G 21/055; B60G 21/0553; B60G 21/0555; B60G 2300/124; B60G 2204/422; B60G 2300/07; B60G 17/08; B60G 11/182; B60G 11/20
USPC .................................................. 280/124.106
See application file for complete search history.

(56) References Cited

U.S. PATENT DOCUMENTS

| 3,400,945 | A | * | 9/1968 | Sampietro | ................. | B60G 3/14 |
| | | | | | | 267/221 |
| 5,161,822 | A | * | 11/1992 | Lund | ........................ | F16F 9/48 |
| | | | | | | 280/5.506 |
| 5,630,623 | A | * | 5/1997 | Ganzel | ................. | B60G 17/016 |
| | | | | | | 280/124.157 |
| 7,318,593 | B2 | | 1/2008 | Sterly et al. | | |
| 8,382,130 | B2 | * | 2/2013 | Nakamura | ................ | B60G 3/20 |
| | | | | | | 280/5.521 |
| 8,651,503 | B2 | * | 2/2014 | Rhodig | ..................... | B62D 9/02 |
| | | | | | | 280/5.509 |
| 8,973,930 | B2 | * | 3/2015 | Rhodig | .................. | B60G 21/00 |
| | | | | | | 280/5.509 |
| 9,050,869 | B1 | * | 6/2015 | Pelzer | ................... | B60G 15/067 |
| 9,150,070 | B2 | * | 10/2015 | Luttinen | ................... | B62D 7/18 |
| 9,186,952 | B2 | * | 11/2015 | Yleva | ..................... | B60G 3/145 |
| 9,937,762 | B2 | * | 4/2018 | Sunahiro | ................. | B60G 11/20 |
| 10,137,873 | B2 | * | 11/2018 | Bowers | ................... | B60N 2/005 |
| 10,189,428 | B1 | * | 1/2019 | Sellars | .................... | B60R 19/34 |
| 10,207,554 | B2 | | 2/2019 | Schroeder et al. | | |

(Continued)

FOREIGN PATENT DOCUMENTS

| DE | 3705520 | A1 | * | 9/1988 | | |
| EP | 3461663 | A1 | * | 4/2019 | ............. | B60G 11/27 |
| GB | 2552237 | A | * | 1/2018 | ............. | B60G 13/06 |

OTHER PUBLICATIONS

Machine translation of DE 3705520 A1 from espacenet.com Nov. (Year: 2022).*

*Primary Examiner* — Paul N Dickson
*Assistant Examiner* — Maxwell L Meshaka
(74) *Attorney, Agent, or Firm* — Fay Kaplun & Marcin, LLP (57) ABSTRACT

A vehicle includes wheels, suspension links, a torsion bar, and electronically controlled dampers. The suspension links support the wheels. The torsion bar generates a force to resist a tilting of the vehicle in the body roll direction. The electronic control dampers connect the torsion bar to the suspension links. At least a portion of each suspension links is located in front of the corresponding electronically controlled damper.

8 Claims, 6 Drawing Sheets

(56) References Cited

U.S. PATENT DOCUMENTS

| | | | | |
|---|---|---|---|---|
| 10,479,408 | B2* | 11/2019 | Upah | B62D 23/005 |
| 11,142,033 | B2* | 10/2021 | Yoshida | B60G 3/20 |
| 11,192,414 | B1* | 12/2021 | Berardi | B60G 7/003 |
| 11,364,762 | B2* | 6/2022 | Hadi | B60G 11/27 |
| 2011/0025012 | A1* | 2/2011 | Nakamura | B60G 3/20 |
| | | | | 280/124.135 |
| 2011/0215544 | A1* | 9/2011 | Rhodig | B62K 5/10 |
| | | | | 280/124.103 |
| 2014/0125027 | A1* | 5/2014 | Rhodig | B62K 5/01 |
| | | | | 280/124.103 |
| 2015/0091269 | A1* | 4/2015 | Yleva | B60G 3/145 |
| | | | | 280/124.152 |
| 2015/0108732 | A1* | 4/2015 | Luttinen | B60G 3/265 |
| | | | | 280/93.512 |
| 2016/0082802 | A1* | 3/2016 | Izak | B60G 17/08 |
| | | | | 280/6.157 |
| 2016/0236528 | A1* | 8/2016 | Sunahiro | B60G 3/20 |
| 2016/0347137 | A1* | 12/2016 | Despres-Nadeau | B60G 3/202 |
| 2018/0265062 | A1* | 9/2018 | Bowers | B60T 7/042 |
| 2019/0217894 | A1* | 7/2019 | Upah | B62D 3/126 |
| 2020/0238781 | A1* | 7/2020 | Hadi | B60G 17/0152 |
| 2021/0031713 | A1* | 2/2021 | Kotrla | B60G 7/001 |
| 2021/0268860 | A1* | 9/2021 | Randall | F16F 9/56 |
| 2021/0300141 | A1* | 9/2021 | De Grammont | B60G 21/0551 |
| 2021/0402837 | A1* | 12/2021 | Azuma | B60G 3/26 |
| 2022/0041029 | A1* | 2/2022 | Randall | F16F 9/10 |
| 2022/0080796 | A1* | 3/2022 | Dong | B60G 13/003 |
| 2022/0134830 | A1* | 5/2022 | Voelkel | B60G 17/0152 |
| | | | | 188/313 |
| 2022/0227191 | A1* | 7/2022 | Dong | B60G 3/202 |
| 2022/0288990 | A1* | 9/2022 | Smith | B60G 17/016 |
| 2022/0332159 | A1* | 10/2022 | Corsico | B60G 11/16 |

* cited by examiner

VEHICLE

TECHNICAL FIELD

The present disclosure relates to a vehicle equipped with a stabilizer.

BACKGROUND ART

For a vehicle with independent suspensions, sometimes a stabilizer is used to reduce its body roll. The stabilizer includes a torsion bar. The ends of the torsion bar are connected to the links of the right and left suspensions by connecting members.

SUMMARY OF THE INVENTION

Installing an electronically controlled damper at each connection portion of the right and left suspension links and the ends of the torsion bar enables the substantial adjustment of the stiffness of the torsion bar. It is useful, for example, to improve ride quality depending on the situation. However, the electronically controlled dampers can collide with obstacles while the vehicle is moving. Therefore, there has been a need for the protection of the electronically controlled dampers with simple configuration.

The present disclosure relates to protection of the electronically controlled dampers of the stabilizer with a simple configuration.

According to an aspect of the present disclosure, a vehicle with configuration described below is provided. That is, the vehicle includes wheels, suspension links, a torsion bar, and electronically controlled dampers. The suspension links supports the wheels. The torsion bar generates a force resisting the tilting of the vehicle in the body roll direction. The electronically controlled dampers connect the torsion bar and the suspension links. At least a portion of each suspension link is located in front of the corresponding electronically controlled damper.

This enables the prevention of damage to the dampers caused by objects come flying from the front while the vehicle is moving.

DETAILED DESCRIPTION

Figure 1:
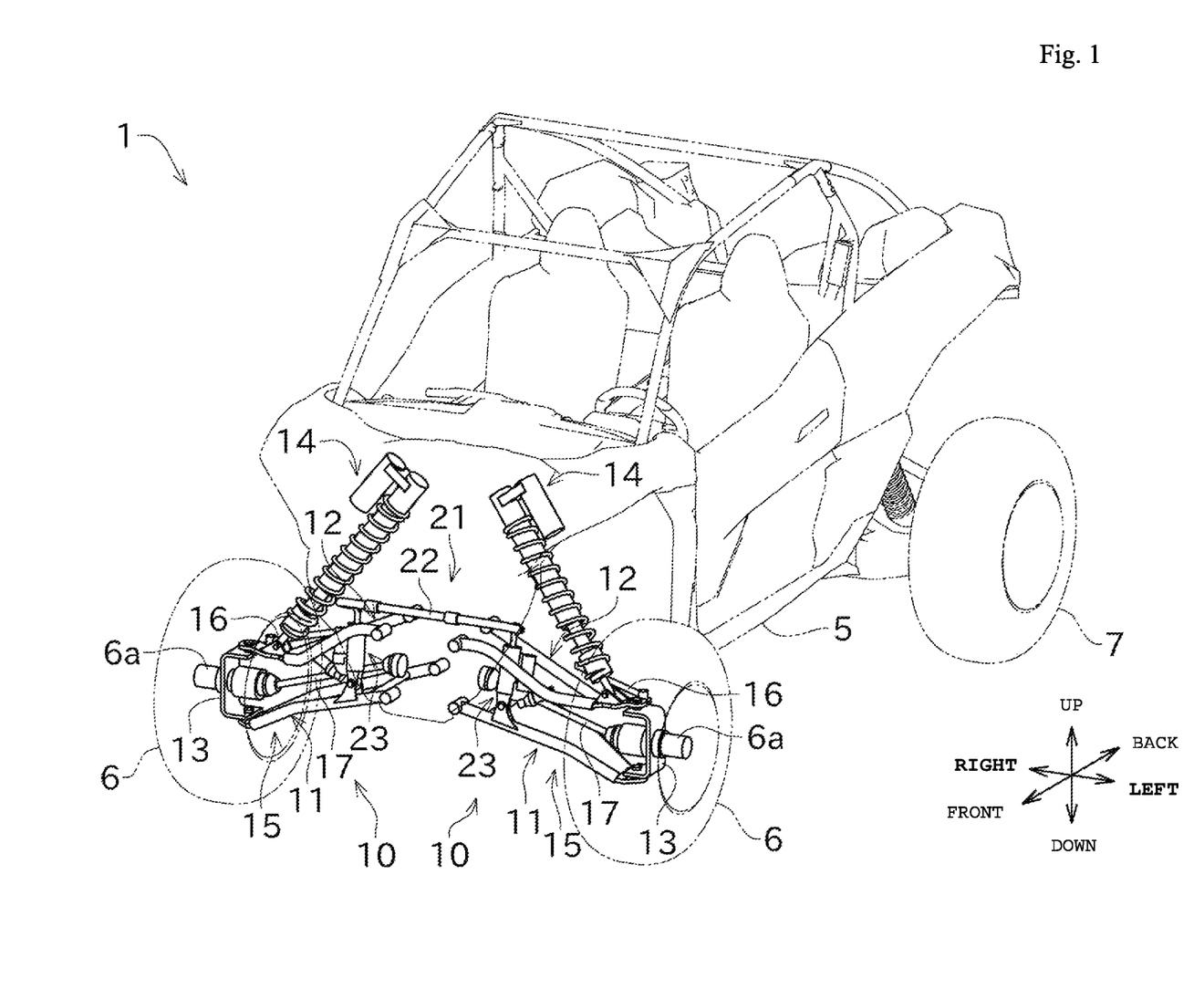
FIG. 1 is a perspective view showing an overall configuration of an utility vehicle according to a first embodiment of the present disclosure.

Embodiments of the present disclosure will be described below with reference of the drawings. FIG. 1 shows an overall configuration of an utility vehicle 1 according to a first embodiment of the present disclosure.

In the following description, the right and left of a driver driving the utility vehicle 1 are defined as the right and left of the utility vehicle 1. Thus, the front-rear direction of the utility vehicle 1 corresponds to its length direction, and the crosswise direction thereof corresponds to its width direction. In addition, the top-bottom direction (vertical direction) thereof corresponds to its height direction.

In this specification, when it is described that a member is "attached" to another member, it indicates cases including that in which the member is directly attached as well as that in which it is indirectly attached by yet another member. The same applies to "fixed," "supported" and "connected."

The utility vehicle 1 of the present embodiment is a sport off-road four-wheeled vehicle. The utility vehicle 1 includes a frame 5, a pair of front wheels 6 and a pair of rear wheels 7. The front wheels 6 and rear wheels 7 correspond to wheels.

At the rear of the utility vehicle 1, an engine, which is not shown in the drawings, is supported by the frame 5. Driving force generated by the engine is shifted and transmitted to the rear wheels 7 by a transmission, not shown in the drawings. This allows the utility vehicle 1 to move. By an operation of a driver, the driving force generated by the engine can also be transmitted to the front wheels 6 as well as to the rear wheels 7.

Independent suspension mechanisms 10 are attached to the right front and left front of the frame 5. Each of the front wheels 6 is supported by the corresponding suspension mechanism 10 with respect to the frame 5. Since the two suspension mechanisms 10 have the same configurations, the left suspension mechanism 10 will be described below as a representative of the two.

As shown in FIG. 2 through FIG. 5, the suspension mechanism 10 includes a lower arm 11, an upper arm 12, an axle supporting member 13, and a suspension unit 14. The lower arm 11 corresponds to a first arm member and the upper arm 12 corresponds to a second arm member. A suspension link 15 is comprised of the lower arm 11 and the upper arm 12.

The lower arm 11 includes a lower arm front part 11a and a lower arm rear part 11b. Each of the lower arm front part 11a and the lower arm rear part 11b is comprised of a long and thin member. The lower arm front part 11a corresponds to a first link arm part and the lower arm rear part 11b corresponds to a second link arm part.

Figure 4:
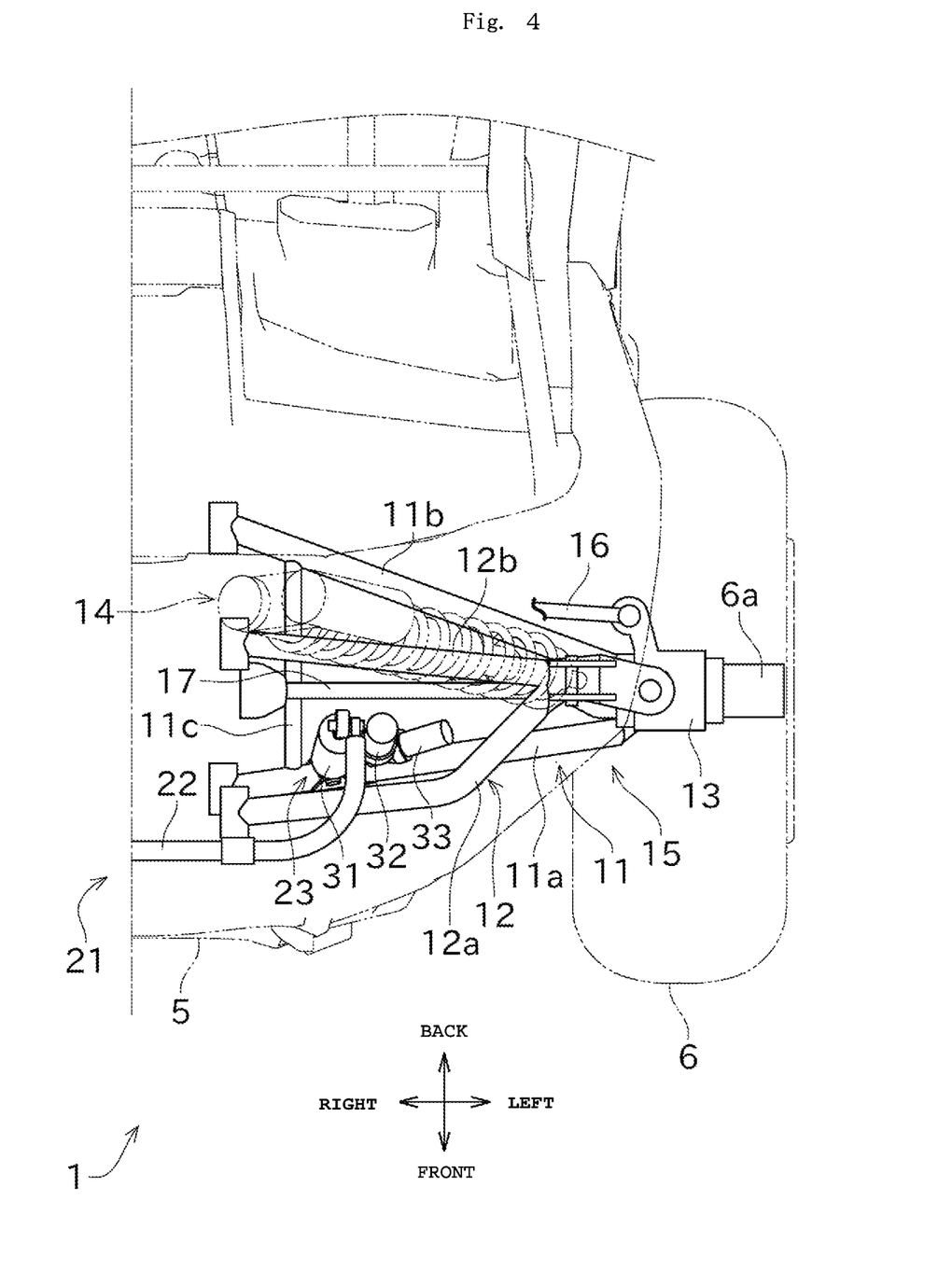
FIG. 4 is a planer view showing the suspension of the front left side of the vehicle.

As shown in FIG. 4, each of the lower arm front part 11a and the lower arm rear part 11b is installed to tilt with respect to the crosswise direction of the vehicle in planar view. The inner end of the lower arm front part 11a in the crosswise direction of the vehicle is positioned forward with respect to the outer end. The inner end of the lower arm rear part 11b in the crosswise direction of the vehicle is positioned backward with respect to the outer end.

The lower arm front part 11a and the lower arm rear part 11b are connected at the outer ends of them in the crosswise direction of the vehicle. In this manner, the lower arm 11 that is V-shaped in planer view is formed.

Figure 5:
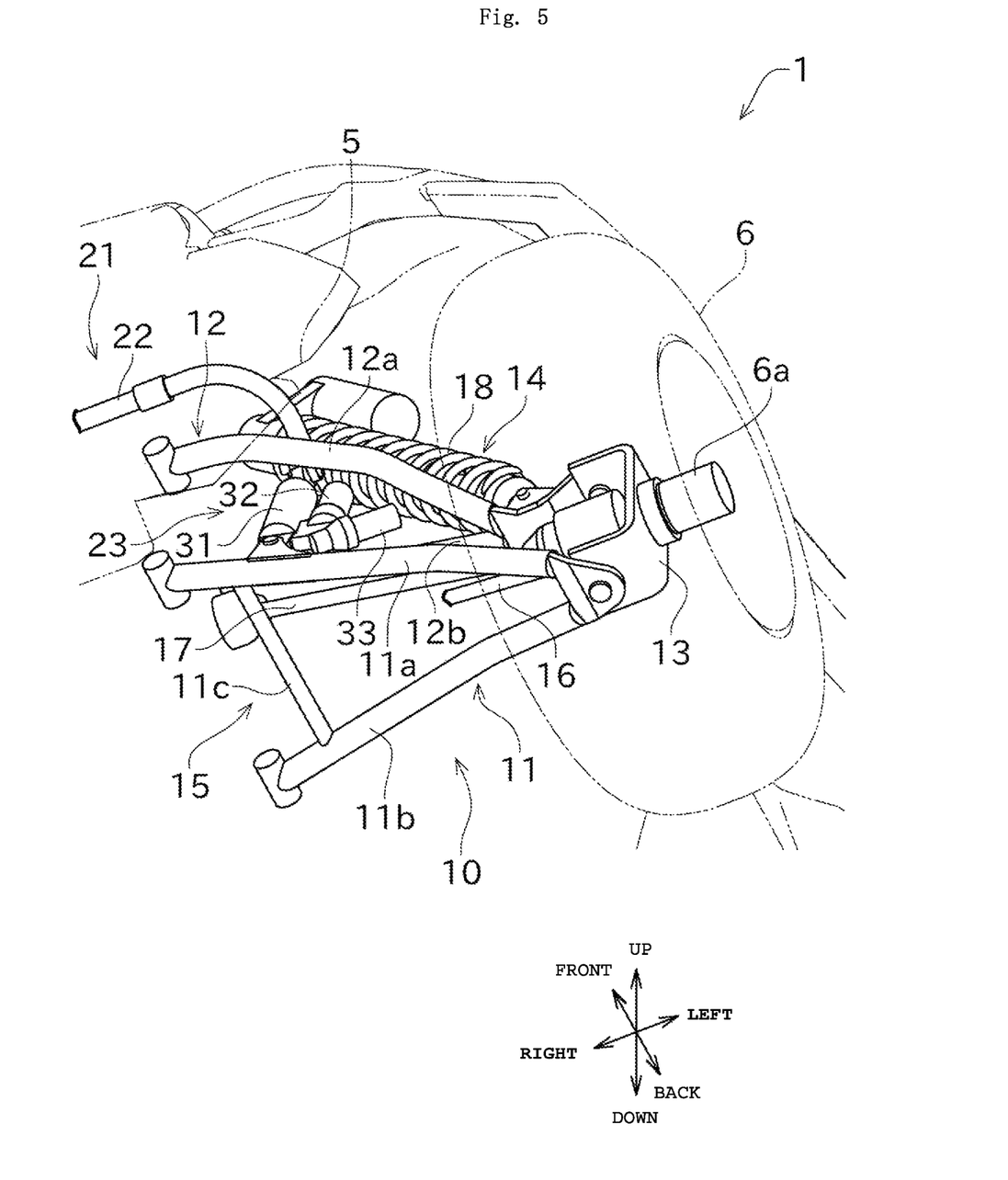
FIG. 5 is a perspective view showing the suspension of the front left side of the vehicle viewed from the bottom side.

As shown in FIG. 5, the lower arm front part 11a and the lower arm rear part 11b are connected to each other by a connecting member 11c extending in the lengthwise direction of the vehicle. This allows the enhancement of the stiffness of the lower arm 11. The connecting member 11c may be omitted.

The inner end of the lower arm front part 11a in the crosswise direction of the vehicle is supported by the frame 5 to be rotatable about an axis in lengthwise direction of the vehicle. Similarly, the inner end of the lower arm rear part 11*b* in the crosswise direction of the vehicle is supported by the frame 5 to be rotatable about an axis in lengthwise direction of the vehicle. This allows the lower arm 11 to swing, moving its external side in the crosswise direction of the vehicle up and down.

The upper arm 12 includes an upper arm front part 12*a* and an upper arm rear part 12*b*. Each of the upper arm front part 12*a* and the upper arm rear part 12*b* is comprised of a long and thin member.

As shown in FIG. 4, each of the upper arm front part 12*a* and the upper arm rear part 12*b* is installed to tilt with respect to the crosswise direction of the vehicle in planner view. The inner end of the upper arm front part 12*a* in the crosswise direction of the vehicle is positioned forward with respect to the outer end. The inner end of the upper arm rear part 12*b* in the crosswise direction of the vehicle is positioned backward with respect to the outer end.

The upper arm front part 12*a* and the upper arm rear part 12*b* are connected at the outer ends of them in the crosswise direction of the vehicle. In this manner, the upper arm 12 that is V-shaped in planer view is formed.

The inner end of the upper arm front part 12*a* in the crosswise direction of the vehicle is supported by the frame 5 to be rotatable about an axis in lengthwise direction of the vehicle. Similarly, the inner end of the upper arm rear part 12*b* in the crosswise direction of the vehicle is supported by the frame 5 to be rotatable about an axis in lengthwise direction of the vehicle. This allows the upper arm 12 to swing, moving its external side in the crosswise direction of the vehicle up and down.

The axle supporting member 13 connects the outer end of the upper arm 12 in the crosswise direction of the vehicle and the outer end of the lower arm 11 in the crosswise direction of the vehicle. The upper arm 12, the lower arm 11 and the axle supporting member 13 constitute a parallel link mechanism. The axle supporting member 13 rotatably supports a front wheel axle 6*a*. The front wheel axle 6*a* is connected to the front wheel 6. In response to the swing of the upper arm 12 and the lower arm 11, the height of the axle supporting member 13 and the front wheel 6 changes as indicated by the arrow in FIG. 3.

Spherical bearings are installed at the upper and lower ends of the axle supporting member 13. This allows the axle supporting member 13 to rotate about the vertical axis along with the front wheel 6. The axle supporting member 13 includes a knuckle arm portion and a tie rod 16 is connected to this knuckle arm portion. As the tie rods 16 are pushed and pulled in response to a driver's steering operation, the direction of the front wheels 6 can be changed by the axle supporting member 13.

A transmission shaft 17 is connected to the front wheel axle 6*a*. A front axle case, not shown in the drawings, is installed at the center of the front portion of the frame 5 in the crosswise direction of the vehicle. The transmission shaft 17 can transmit driving force from the front axle case to the front wheel axle 6*a*. The transmission shaft 17 is located higher than the lower arm 11 and lower than the upper arm 12. Thus, the transmission shaft 17 passes through the area surrounded by the suspension link 15.

The suspension unit 14 is arranged to connect the outer end of the upper arm 12 in the crosswise direction of the vehicle and the upper part of the front portion of the frame 5. The length of the suspension unit 14 changes in response to the swing of the upper arm 12 and the lower arm 11 in the vertical direction.

For the configuration of the suspension unit 14 is publicly known, it will be described briefly below. The suspension unit 14 includes two tubes coupled to each other. The two tubes can slide with respect to each other. The two tubes move relative to each other as the front wheel 6 moves up and down, thus the length of the suspension unit 14 changes.

A spring 18 is installed to connect the two tubes. An oil chamber filled with oil, not shown in the drawings, is formed inside the two tubes. When the two tubes move relative to each other, the spring 18 expands or contracts. At the same time, the oil in the oil chamber passes through a channel not shown in the drawings. In this manner, damping force is provided with respect to the movement of the tubes, thereby the speed of the vertical movement of the front wheel 6 relative to the frame 5 can be reduced. As a result, shocks and vibrations caused by dumps in the road and received from the front wheel 6 during driving can be absorbed.

The suspension unit 14 is configured as a publicly known electronically controlled suspension unit. Damping forces generated by each of the right and left suspension units 14 are adjusted under the control of a suspension ECU, not shown in the drawings. ECU stands for Electric Control Unit.

Next, the stabilizer 21 that connects the right and left suspension mechanisms 10 will be described below. The stabilizer 21 includes a torsion bar 22 and a pair of right and left dampers 23.

The torsion bar 22 is a long and thin member formed in a U-shape in planer view. The central portion of the torsion bar 22 is supported by the front portion of the frame 5. The central portion of the torsion bar 22 can rotate about an axis extending in the crosswise direction of the vehicle. Both ends of the torsion bar 22 in the longitudinal direction are located rearward with respect to its central portion supported by the frame 5.

Each of the dampers 23 is attached to each of the ends of the torsion bar 22 in the longitudinal direction respectively. Each of the damper 23 connects the end of the torsion bar 22 and the lower arm 11 of the corresponding suspension mechanism 10. Spherical bearings, not shown in the drawings, are installed at both ends of each of the dampers 23.

Consider a case where the vertical displacements of the right and left suspension mechanisms 10 got out of synchronization. Possible causes of such a situation include, without limitation, one of the right and left front wheels 6 riding up on a rock and a body roll that allows the vehicle body to lean to the outside of the corner occurring during the vehicle turning. For ease of explanation, assume that the lengths of the dampers 23 are always constant. When one of the front wheels 6 rises with respect to the frame 5, the suspension mechanism 10 of the same side of the wheel 6 rising pushes up the torsion bar 22 by the damper 23. Because of the difference in height between the two ends of the torsion bar 22, a twist occurs at the central portion of the torsion bar 22. A restoring force corresponding to this twist is generated in the torsion bar 22 and transmitted to the right and the left suspension mechanisms 10. This restoring force acts on the right and left suspension mechanisms 10 so that the height difference of the right and left front wheels 6 with respect to the frame 5 is brought closer to zero. As a result, the body roll of the vehicle can be reduced and the stability of driving can be obtained.

The dampers 23 are configured as publicly known electronically controlled dampers. The dampers 23 has substantially the same configuration as the oil-type dampers used in the suspension units 14.

Specifically, the damper 23 includes a damper body 31, a reservoir 32, and a connector 33.

The damper body 31 is cylindrical in shape. A piston rod is slidably attached to the damper body 31. The length of the damper body 31 changes in conjunction with the sliding movement of the piston rod. An oil chamber is formed inside the damper body 31. Inside the oil chamber is filled with oil. A piston or a shaft that moves in response to the expansion and contraction of the length of the damper 23 is installed inside the oil chamber.

The reservoir 32 is cylindrical in shape. Oil in the oil chamber of the damper body 31 can flow into and from the interior space of the reservoir 32. An air pocket is formed in the reservoir 32.

A flow channel through which oil can pass is arranged inside the damper body 31 or inside the reservoir 32. Oil passes through the channel as the piston or the shaft moves inside the damper body 31. The resistance made in this channel can generate a dumping force that resists the expansion or the contraction of the damper 23.

An actuator, not shown in the drawings, is installed in the said flow channel in order to adjust the resistance to the passage of oil. The actuator may be, for example, but not limited to, a solenoid valve.

An electrical cable, not shown in the drawings, may be connected to the connector 33. By supplying electricity via the connector 33, the said solenoid valve can be activated.

Each of the right and left dampers 23 operates the corresponding solenoid valve in response to the control of the damper ECU, which is not shown in the drawings. This allows the substantial adjust of the degree to which the stabilizer 21 acts.

As shown in FIG. 4, the lower arm front part 11a is located rearward with respect to the upper arm front part 12a and forward with respect to the upper arm rear part 12b in planer view.

The lower end of the damper 23 is connected to the midpoint of the lower arm front part 11a in the longitudinal direction. The position on the lower arm front part 11a to which the damper 23 is attached is near the portion of the lower arm front part 11a that is connected to the connecting member 11c.

The damper 23 extends upwardly from the point where it connects with the lower arm front part 11a and is connected to the end of the torsion bar 22 at the position higher than the upper arm 12. Thus, the upper arm front part 12a is arranged to pass in front of the damper 23. Similarly, the upper arm rear part 12b and the transmission shaft 17 are arranged to pass behind of the damper 23.

When the utility vehicle 1 goes off-road, objects such as pebbles often fly from outside the vehicle. According to the configuration of the present embodiment, with the upper arm front part 12a and the upper arm rear part 12b, the damper 23 can be protected from collisions with pebbles and other objects. As a result, the reliability of the operation of the damper 23 is improved.

The lower end of the damper 23 is positioned higher than the lower arm 11 and lower than the upper arm 12. Thus, a compact configuration that interlocks the suspension mechanism 10 with the stabilizer 21 can be achieved.

As shown in FIG. 4, the lower arm front part 11a and the upper arm front part 12a are arranged at different positions with respect to the front-rear direction. This provides an arrangement of the damper 23 connected to the lower arm front part 11a and the upper arm front part 12a that prevents interference between them.

Within the damper 23, the reservoir 32 is located at the outer position with respect to the damper body 31 in the crosswise direction of the vehicle and located adjacent to the damper body 31. The connector 33 is located at the outer position with respect to the damper body 31 in the crosswise direction of the vehicle and located adjacent to the damper body 31. The term "adjacent" shall mean that the distance between two things is smaller than the outside diameter of the damper body 31 (including cases in which there is no space between them.) This provides a configuration wherein the damper 23 is compact and less likely to interfere with the suspension link 15. In the configuration provided by the above-described arrangement of the damper body 31, the reservoir 32, and the connector 33 the damper 23 is also less likely to interfere with the transmission shaft 17.

As described above, the utility vehicle 1 of the present embodiment includes the front wheels 6, the suspension links 15, the torsion bar 22, and the electronically controlled dampers 23. The suspension links 15 support the rear wheels 7. The torsion bar 22 generates a force resisting the tilting of the vehicle in the body roll direction. The dampers 23 connect the torsion bar 22 and the suspension links 15. A portion of each of the suspension link 15 is located in front of the corresponding damper 23.

In this manner, the suspension links 15 can prevent the dampers 23 from being damaged by objects come flying from the front while the utility vehicle 1 is in motion.

Within the utility vehicle 1 of the present embodiment, a portion of each of the suspension links 15 is located behind the corresponding damper 23.

In this manner, the dampers 23 can be properly protected against objects come flying from both the front and rear.

Within the utility vehicle 1 of the present embodiment, each of the suspension links 15 includes the lower arm 11 and the upper arm 12. The upper arm 12 is installed above the lower arm 11. Each lower end of the dampers 23 is arranged higher than the lower arm 11 and lower than the upper arm 12.

This allows the entire arrangement of the suspension links 15 and the dampers 23 to be compact.

Within the utility vehicle 1 of the present embodiment, the lower arm 11 and the upper arm 12 are positioned at different locations with respect to the front-rear direction. Each of the damper 23 is connected to the corresponding lower arm 11.

This allows an arrangement wherein each of the damper 23 is less likely to interfere with the lower arm 11 and the upper arm 12.

Within the utility vehicle 1 of the present embodiment, each of the upper arms 12 belonging to the suspension links 15 includes an upper arm front part 12a and the upper arm rear part 12b. The upper arm rear part 12b is positioned behind the upper arm front part 12a. Each of the dampers 23 is located behind the upper arm front part 12a and in front of the upper arm rear part 12b.

In this manner, both front and rear side of the dampers 23 can be properly protected by the upper arms 12.

Within the utility vehicle 1 of the present embodiment, the reservoirs 32 and the connectors 33 belonging to each of the dampers 23 are arranged in the space surrounded by parts of the corresponding suspension link 15 (specifically, parts of the upper arm 12) in the front-rear direction.

In this manner, the dampers 23 including the reservoirs 32 and the connectors 33 can be properly protected by the upper arms 12.

Within the utility vehicle 1 of the present embodiment, each of the dampers 23 includes the damper body 31, the reservoir 32, and the connector 33. The damper body 31 is extendable and retractable. The reservoir 32 can accommodate oil which is a pressure medium of the damper body 31. The connector 33 can be connected with electrical cables.

The damper body 31 is positioned adjacent to the reservoir 32 with respect to the crosswise direction of the vehicle in planner view.

In this manner, a configuration wherein the suspension links 15 and the dampers 23 are unlikely to interfere with each other can be easily obtained.

Figure 6:
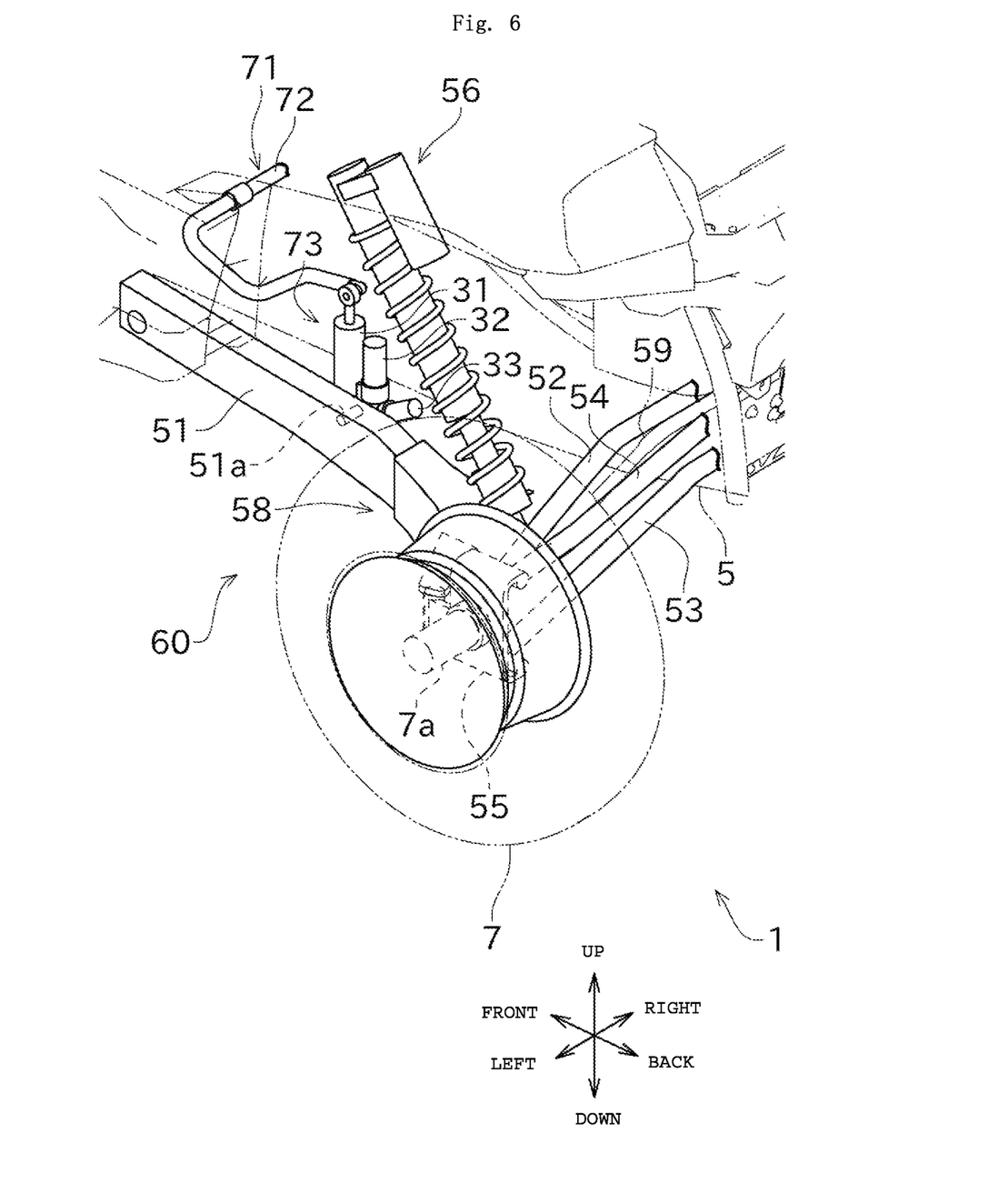
FIG. 6 is a perspective view showing a suspension of the rear left side of an utility vehicle according to a second embodiment of the present disclosure.

Next, a second embodiment will be described below. FIG. 6 is a perspective view showing a suspension mechanism 60 on the rear left side of the vehicle. Within the description of the present embodiment, the same or similar components as that of the above-described first embodiment may be marked with the same references in the drawings and the description thereof may be omitted.

In the present embodiment, a stabilizer 71 with dampers 73 is applied with respect to the suspension mechanism 60 of the rear wheels 7.

Each of the pair of right and left rear wheels 7 is supported by the corresponding suspension mechanism 60 with respect to the frame 5. Since the two suspension mechanisms 60 have the same configurations, the left suspension mechanism 60 will be described below as a representative of the two.

The suspension mechanism 60 includes a trailing arm 51, a connecting arm 52, a lower arm 53, an upper arm 54, an axle supporting member 55, and a suspension unit 56. A suspension link 58 is comprised of the trailing arm 51, the connecting arm 52, the lower arm 53, and the upper arm 54.

The trailing arm 51 extends diagonally backward from the left side of the frame 5. The axle supporting member 55 is connected to the rear end of the trailing arm 51. A rear wheel axle 7a is rotatably supported by this axle supporting member 55. The rear wheel axle 7a is connected to the rear wheel 7.

A transmission shaft 59 is connected to the rear wheel axle 7a. A rear axle case, not shown in the drawings, is installed at the center of the rear portion of the frame 5 in the crosswise direction of the vehicle. The transmission shaft 59 can transmit driving force from the rear axle case to the rear wheel axle 7a.

The front end of the trailing arm 51 is supported by the frame 5 to be rotatable about an axis in the crosswise direction of the vehicle. This allows the trailing arm 51 to swing, moving its rear portion up and down.

The connecting arm 52 is comprised of a long and thin member. The inner end of the connecting arm 52 in the crosswise direction of the vehicle is supported by the frame 5 to be rotatable about an axis extending in the front-rear direction. This allows the connecting arm 52 to swing, moving its external side in the crosswise direction of the vehicle up and down. The external side of the connecting arm 52 in the crosswise direction of the vehicle is connected to the rear end of the trailing arm 51 by a spherical bearing.

Each of the lower arm 53 and the upper arm 54 is comprised of a long and thin member. The upper arm 54 is positioned higher than the lower arm 53.

Each of the inner ends of the lower arm 53 and the upper arm 54 in the crosswise direction of the vehicle is supported by the frame 5 to be rotatable about an axis extending in the front-rear direction. This allows the lower arm 53 and the upper arm 54 to swing moving their external sides in the crosswise direction of the vehicle up and down. Each of the external sides of the lower arm 53 and the upper arm 54 in the crosswise direction of the vehicle is connected to the rear end of the axle supporting member 55 by a spherical bearing.

In this manner described above, the connecting arm 52, the lower arm 53, and the upper arm 54 swing in conjunction with the vertical swinging of the connecting arm 52.

The suspension unit 56 is installed to connect the rear end of the trailing arm 51 and the frame 5. The configuration of the suspension unit 56 is substantially the same as that of the suspension unit 14 described above. The length of the suspension unit 56 changes in response to the swinging movement of the trailing arm 51 in the vertical direction.

The suspension unit 56 absorbs shocks and vibrations caused by dumps in the road and received from the rear wheel 7 during driving.

The stabilizer 71 includes a torsion bar 72 formed in a U-shape in planner view. The end of the torsion bar 72 in the longitudinal direction is connected to the midsection of the trailing arm 51 in the longitudinal direction by the damper 73. Similarly to the stabilizer 21 of the front of the vehicle, the damper 73 is an electronically controlled damper.

The trailing arm 51 tilts outwards with respect to the crosswise direction of the vehicle in a planer view as it extends rearward. The damper 73 is installed with its lower end located at the inner position in the crosswise direction of the vehicle with respect to the trailing arm 51. A connecting protrusion 51a is installed at the lower end of the center portion of the trailing arm 51 in the longitudinal direction. It is arranged protruding inwardly in the crosswise direction of the vehicle from the said center portion of the trailing arm 51. The lower portion of the damper 73 is connected to the trailing arm 51 by this connecting protrusion 51a.

As shown in FIG. 6, the trailing arm 51 passes in front of the damper 73 and the connecting arm 52 and the upper arm 54 pass behind the damper 73. Thus, the trailing arm 51, the connecting arm 52, and the upper arm 54 belonging to the suspension link 58 protect the damper 73 from collisions with pebbles and other objects.

Within the damper 73, a reservoir 32 is located at the rear position with respect to a damper body 31 and located adjacent to the damper body 31. A connector 33 is located at the rear position with respect to the reservoir 32 and located adjacent to the reservoir 32. In this manner, the damper 73 can be compactly arranged in the narrow space between the frame 5 and the trailing arm 51.

Although the preferred embodiments and the modifications of the present disclosure have been described above, the configurations described above may be modified as follows, for example. Such a modification may be made singularly or made in combination with any other modifications.

The upper arm front part 12a may be positioned right above the lower arm front part 11a. Even in this case, by setting the angle of the rearward tilt of the damper 23 appropriately, the damper 23 can be arranged behind the upper arm front part 12a without interfering with the upper arm front part 12a.

The lower arm 11 can be configured as a single rod-shaped member instead of two long and thin members connected to each other forming a V-shape. The same applies to the upper arm 12.

Within the damper 23, the connector 33 may be arranged at the outer or inner position with respect to the damper body 31 in the crosswise direction of the vehicle and located adjacent to the damper body 31.

Figure 2:
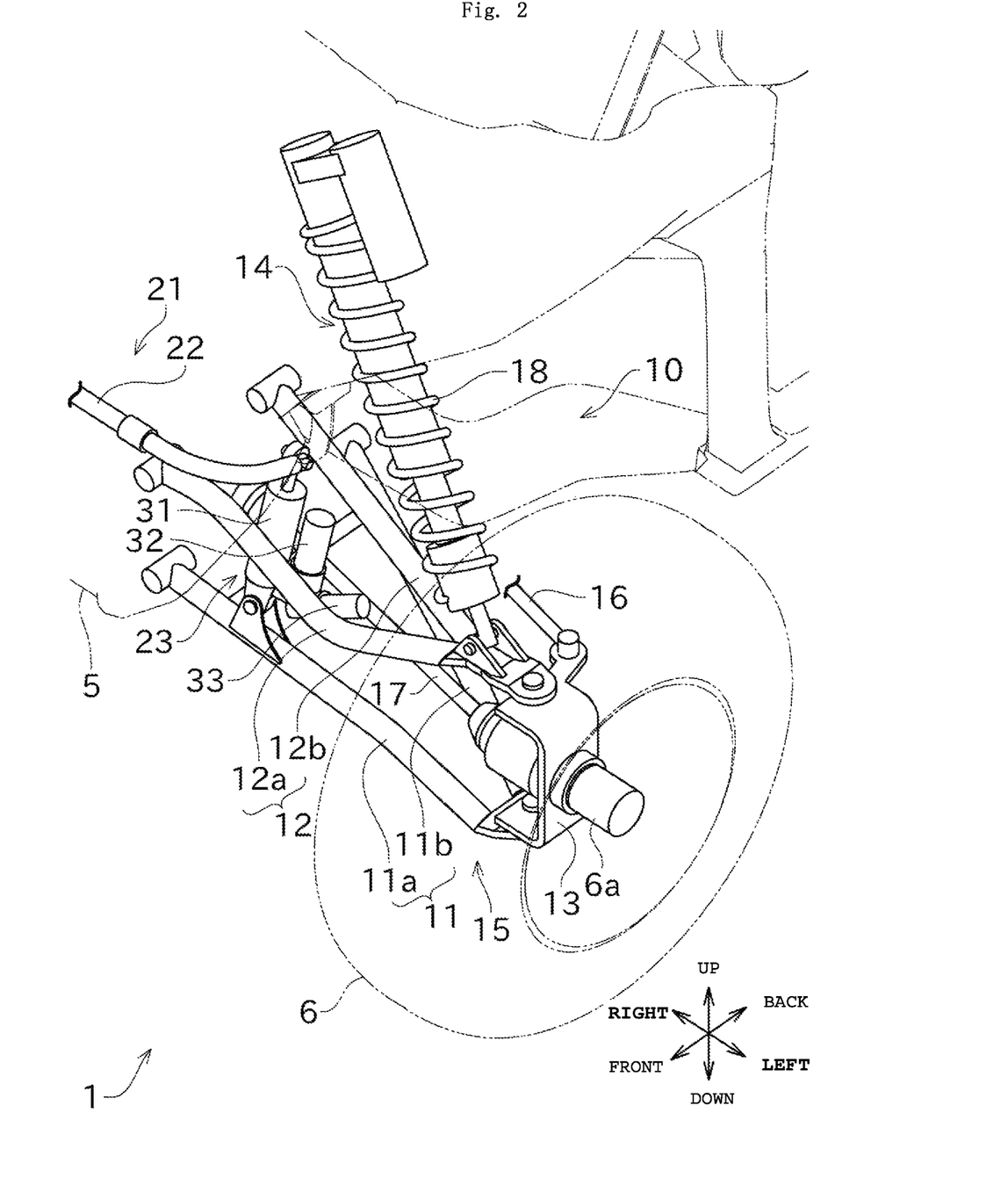
FIG. 2 is a perspective view showing a suspension of the front left side of the vehicle.
Figure 3:
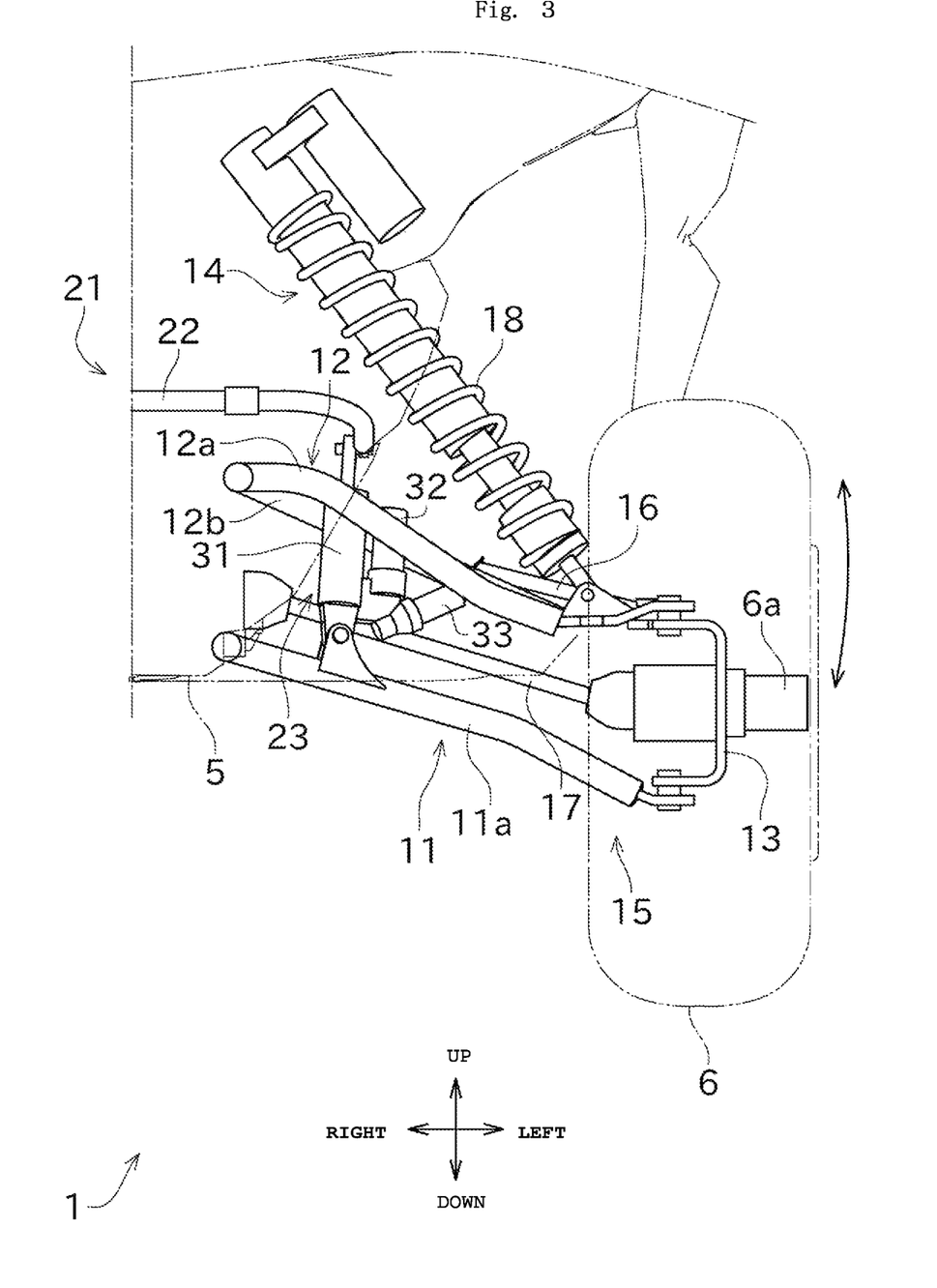
FIG. 3 is a front view showing the suspension of the front left side of the vehicle.

The damper 23 shown in FIG. 2, etc., may be arranged upside down. The same applies to the damper 73 shown in FIG. 6.

Both the arrangement of the damper 23 as shown in FIG. 1 through 5 and the arrangement of the damper 73 as shown in FIG. 6 may be applied to the utility vehicle 1. Only one of them may also be applied the utility vehicle 1.

The invention claimed is:

1. A vehicle, comprising:
   a wheel;
   a suspension link supporting the wheel;
   a torsion bar configured to generate a force to resist a tilting of the vehicle in a body roll direction; and
   an electronically controlled damper connecting the torsion bar and the suspension link,
   wherein at least a portion of the suspension link overlaps in front of the electronically controlled damper in a front of view.

2. The vehicle according to claim 1, wherein the at least a portion of the suspension link overlaps behind the electronically controlled damper in a front view.

3. The vehicle according to claim 1, wherein the suspension link comprises:
   a first arm member; and
   a second arm member arranged above the first arm member, and
   wherein at least a portion of the electronically controlled damper is positioned higher than the first arm member and lower than the second arm member in front view.

4. The vehicle according to claim 3, wherein the first arm member and the second arm member are arranged at different positions in a front-rear direction, and wherein the electronically controlled damper is connected to the first arm member.

5. The vehicle according to claim 2, wherein the suspension link comprises:
   a first link arm part; and
   a second link arm part arranged behind the first link arm part, and
   wherein the electronically controlled damper overlaps behind the first link arm part in the front view and overlaps in front of the second link arm part in the front view.

6. The vehicle according to claim 1, wherein at least one of a reservoir and an electrical connector belonging to the electronically controlled damper is arranged at a position surrounded in a front-rear direction by the suspension link.

7. The vehicle according to claim 6, wherein the electronically controlled damper comprises:
   a damper body extendable and retractable;
   the reservoir capable of accommodating a pressure medium of the damper body; and
   the electrical connector that an electrical cable can be connected to, and
   wherein the damper body is positioned adjacent to at least one of the reservoir and the electrical connector in a crosswise direction of the vehicle.

8. The vehicle according to claim 1, wherein the torsion bar and the electronically controlled damper constitute a stabilizer that connects left and right suspension mechanisms, and the electronically controlled damper includes an actuator to adjust a resistance to a passage of oil.

* * * * *